Feb. 8, 1944.   L. W. DUNCAN   2,341,025
METHOD AND APPARATUS FOR CUTTING PINS
Filed April 9, 1942   3 Sheets-Sheet 1

INVENTOR
LANE W. DUNCAN
BY
Hyde and Meyer
ATTORNEYS

INVENTOR
LANE W. DUNCAN
BY Hyde and Meyer
ATTORNEYS

Feb. 8, 1944.   L. W. DUNCAN   2,341,025
METHOD AND APPARATUS FOR CUTTING PINS
Filed April 9, 1942   3 Sheets-Sheet 3
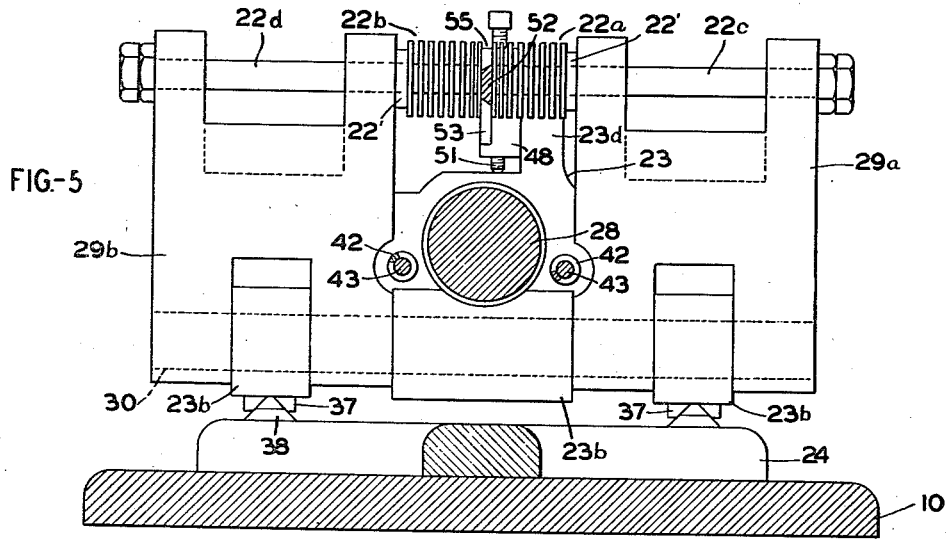
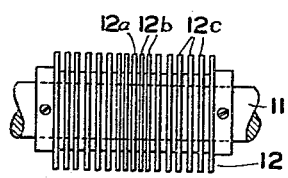
FIG.-6
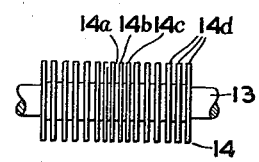
FIG.-7
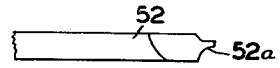
FIG.-12
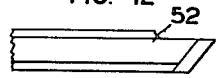
FIG.-13
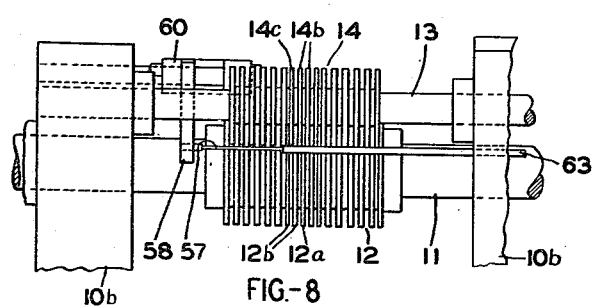
FIG.-8
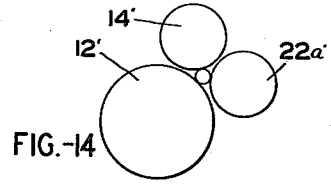
FIG.-14
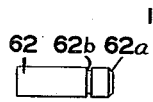
FIG.-10
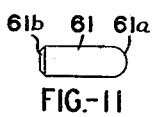
FIG.-11
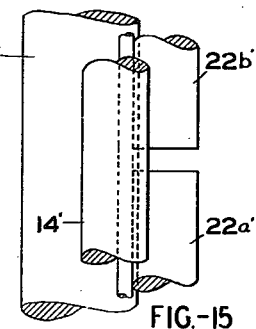
FIG.-15
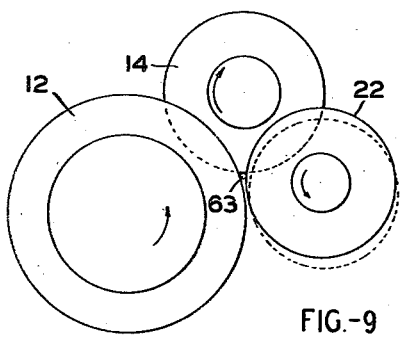
FIG.-9
INVENTOR
LANE W. DUNCAN
BY
Hyde and Meyer
ATTORNEYS Patented Feb. 8, 1944

2,341,025

UNITED STATES PATENT OFFICE 2,341,025

METHOD AND APPARATUS FOR CUTTING PINS

Lane W. Duncan, Cleveland, Ohio, assignor to Eustace E. Blundell, doing business as Commercial Centerless Grinding Company, Cleveland, Ohio Application April 9, 1942, Serial No. 438,303

17 Claims. (Cl. 164—39)

This invention relates to a method and apparatus for cutting pins from a rod and for accurately forming the same.

An object of the present invention is to provide means for accurately forming pins without the necessity for separately setting up and finishing each pin. My improved apparatus and method are particularly useful in the case of very small pins of the order of 1/8" or less in diameter and lengths of about 1/8" and longer. Such small pins are difficult to handle and practically impossible to set up and finish separately. An object of the present invention therefore is to cut and accurately finish pins while at the same time forming special end surfaces on the pins if desired. It should be understood that this machine is not concerned with finishing the cylindrical surface of the pin but only with the accurate cutting to length and finishing of the ends of the pin, although a groove may be cut in the cylindrical surface as will later appear.

Another object of the present invention is the rotation of a cylindrical member of very small diameter at very high speed by means of driving rolls which rotate at relatively slow speed. The peripheral speed of the rolls is transmitted to the periphery of the small cylinder by frictional contact.

One of the essential features involved in the new method here disclosed is the step of rotating the rod as the pin is cut off and the rotating of the pin in position after it is cut off so that no burr is formed and the pin does not break away from the stock but instead is cleanly cut and finished at all times.

Other advantages of my improved method and apparatus will be apparent from the accompanying drawings and description and the essential features will be set forth in the claims.

In the drawings, Fig. 1 is a side elevational view of a machine embodying my invention;

Fig. 5 is a transverse sectional view taken along the line 5—5 of Fig. 4;

Figs. 6 and 7 are detail views of two of the rolls;

Fig. 8 is a fragmental sectional view taken along the line 8—8 of Fig. 2, with the pressure rolls omitted;

Fig. 9 is a diagrammatic view illustrating how three sets of rolls support the stock while it is cut;

Figs. 10 and 11 are representations of pins adapted to be cut on my machine;

Figs. 12 and 13 are top plan and side elevational views respectively of the end of the cutting tool;

Fig. 14 is a diagrammatic view similar to Fig. 9, showing another arrangement of supporting rolls; while Fig. 15 is a fragmental top plan view of the rolls of Fig. 14 corresponding in position to the left-hand central portion of Fig. 2.

Figure 1:
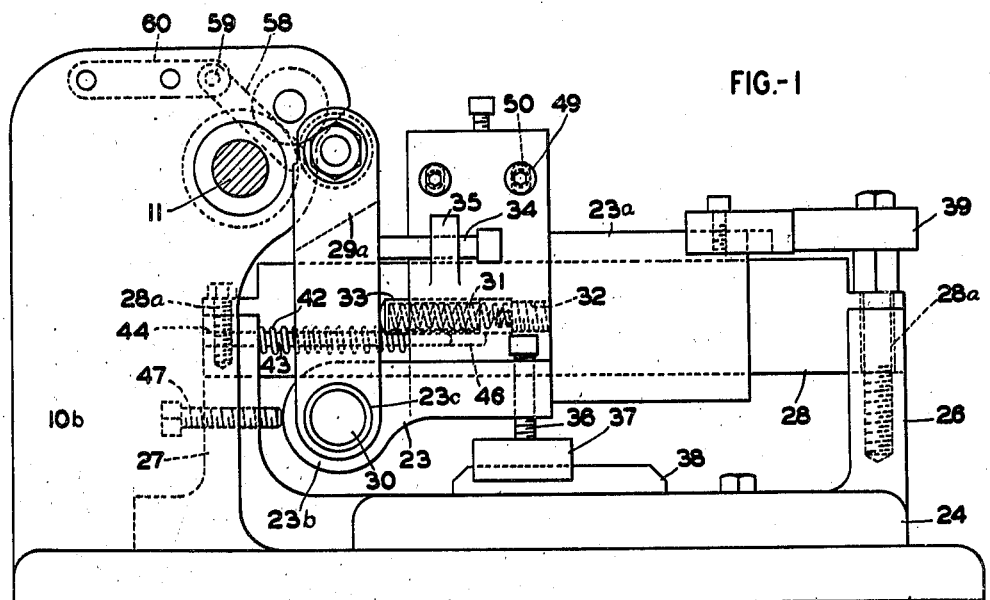

The machine here disclosed is of the bench type and includes a main frame 10 intended to be fastened down upon a suitable bench or other supporting surface at the right height for an operator. Such mounting forms no part of the present invention and therefore need not be further described. The main frame comprises a flat base portion 10a and two parallel vertical posts 10b at one end of the base. Rotatably mounted in suitable bearings in the posts 10b is a driving shaft 11 on which is rigidly mounted a relatively fixed driving roll 12. This roll is secured to shaft 11 by set screws 12a for the purpose of permitting the assembly of the parts. Also journalled in suitable bearings in the posts 10b is a shaft 13 on which is rigidly mounted an upper relatively fixed roll 14. On the shaft 11 is a pulley 15 which is connected by a belt 16 with a suitable driving member mounted on the bench below the base 10a and not shown here. A gear 17 on shaft 11 meshes with gear 18 on a stub shaft 19 which is rotatably mounted in one of the posts 10b. The gear 18 in turn meshes with gear 21 on shaft 13 and the arrangement of the gears is such that the linear speeds of the peripheral surfaces of rolls 12 and 14 are approximately equal and in the direction of the arrows of Fig. 9.

A third or pressure roll 22 is provided in the position indicated in the diagram of Fig. 9. In the present embodiment this is actually two separate pressure rolls 22a and 22b which are coaxially mounted on carriage 23.

The base for this carriage is the subframe 24 which is bolted to the base 10a by bolts 25. This base has upright standards 26 and 27 at each end which are notched as at 26a to receive the shaft 28 on which the cross slide carriage 23 moves. The shaft is held in position by bolts 28a. Slidably mounted on this shaft 28 is the cross slide carriage 23 formed integrally with which is the sleeve 23a slidable along the shaft. The lower left-hand portion of this carriage as viewed in Fig. 1 is provided with three tongue-like projections 23b which are provided with coaxial bored openings 23c. A pair of pressure roll mountings 29a and 29b generally of H-form are pivotally mounted on the carriage 23 by a pivot pin 30 passing through the openings 23c of the carriage and through alined openings in the downwardly extending legs of the members 29a and 29b. In the upwardly extending legs of these same members are rotatably mounted in suitable bearings the shafts 22c and 22d which are respectively rigid with the pressure rolls 22a and 22b which they carry. Means is provided to yieldingly urge the pressure rolls toward the left as viewed in Fig. 1 so that they will yieldingly engage the rolls 12 and 14 as the carriage 23 moves toward the left. This means comprises springs 31 which are anchored at 32 in the carriage 23 and press against thimble-like spring guides 33 which in turn engage against the pressure roll mountings 29a and 29b. Means is provided limiting the movement of the pressure roll mountings in a counterclockwise direction as viewed in Fig. 1. This means comprises bolts 34 which are threaded into the members 29a and 29b and the heads of which engage against projections 35 of the carriage 23.

Means is provided to control the radial position of the carriage 23 about the shaft 28. Through side wings of the carriage are threaded bolts 36, each of which engages in a socket in a shoe 37. These blocks might be flat and bear directly on the base 24. As shown, however, the underside of each of these shoes is provided with an inverted V-shape groove which engages V-shape guides 38 rigid with the subframe 24. By adjusting the screws 36 the position of the carriage is accurately set. The shaft 28 and the two shoes 37 provide a three-point support for the tool-bearing carriage which rigidly and accurately supports tool 52.

Means is provided for feeding the carriage 23 toward the left as viewed in Fig. 1. To this end a cam 39 is rotatably mounted upon the bolt 28a at one end of the machine and this cam is provided with a handle 40 by which it may be rotated. An adjustable follower or abutment 41 is mounted on the end of sleeve 23a. By rotating the cam in a counterclockwise direction as viewed in Fig. 2, the carriage 23 is fed toward the left. Means is provided to accurately limit the movement of carriage 23 toward the left. This comprises a bolt 47 threaded in the pedestal 27 and engaging against one of the projections 23b, although such a stop might engage carriage 23 at any suitable and convenient point.

Figure 2:
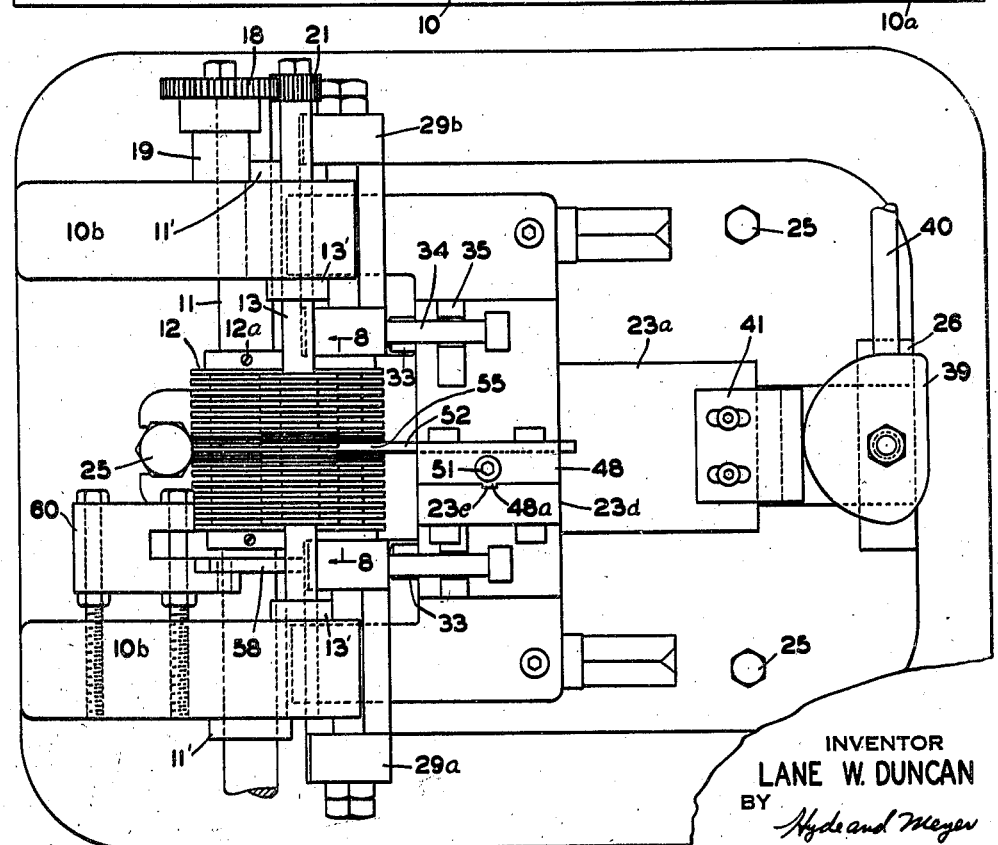
Fig. 2 is a top plan view of the same.
Figure 3:
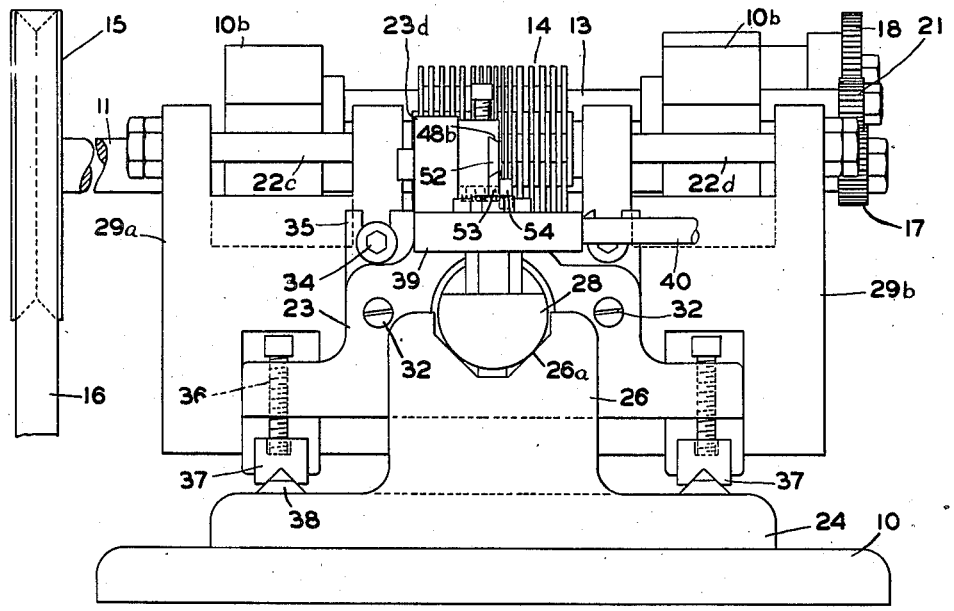
Fig. 3 is an end elevational view taken at the right-hand end of Fig. 1.

Means is provided for returning carriage 23 backwardly or toward the right as viewed in Figs. 1 and 2 when the position of cam 39 permits it. This means comprises a pair of springs 42 which are guided on pins 43. These in turn fit in suitable bores 44 in the pedestal 27, and the pins are held in position by set screws. The ends of pins 43 enter suitable bores 46 in the carriage 23. Obviously the springs 42 engage against the walls of the carriage around the bores 46 and urge the carriage toward the right as viewed in Figs. 1 and 2.

Means is provided for mounting a cutting tool on the carriage 23. To this end the carriage is provided with an upstanding plate portion 23d having a centrally located vertical slot 23e. A tool holder 48 is provided with a rib 48a which fits in the slot 23e. The tool holder is clamped to the portion 23d by a pair of stud bolts 49 which are adjustable in the slots 50 of the member 23d and enter registering threads in the tool clamp 48. A fine adjustment for the tool clamp is provided by an adjusting screw 51 which is threaded in the tool clamp 48 and abuts against the carriage beneath it. The tool holder is adapted to hold a tool 52 having a shank of trapezoidal cross section. To this end the tool holder is undercut at 48b and a tool clamp 53 is provided having a beveled upper surface adapted to clamp against the tool shank. The tool clamp is firmly held in position by the bolts 54. Obviously the tool may be shifted endwise and held in any desired position by the clamp 53.

In the embodiment disclosed thus far the rolls which support and rotate the blank to be cut have their peripheral surfaces formed with alternate annular grooves and ribs with the ribs of one roll projecting into the grooves of two other rolls. Thus each roll in effect may be said to consist of a series of disk-like members which are large in diameter as compared with the diameter of the work rod (several times that diameter), which have a thickness of the order of or approximating that of the rod, and which are spaced apart by gaps of the same order. This is for the purpose of obtaining the best support for the pin while it is cut as will later appear. Referring to Figs. 6 and 8, it will be noted that the driving roll 12 is provided with a centrally located rib 12a which in one form of my machine is of the order of .076″ wide. On each side of this are spaces of the order of .087″ and then two narrower ribs 12b of the order of .0575″ wide separated by a space of .0675″. Located outwardly from the two narrower ribs at each end of the roll are six ribs 12c having a thickness of the order of .088″ and separated by grooves .100″ wide. It will be understood that these dimensions are not limiting but merely represent one form of machine adapted to handle small size pins. The two pressure rolls 22a and 22b have sets of ribs which correspond in width and in number and which register with the ribs 12b and 12c just described. At the center, however, there is a space at the point 55 of about ¼″ between the two pressure rolls which permits the entrance of the tool 52 at this point. The upper roll 14 is constructed so that its ribs enter into the spaces between the ribs of the rolls 12 and 22a and 22b as illustrated in the diagram of Fig. 9. Consequently, the axes of the relatively fixed rolls 14, 12 are spaced apart a distance less than the sum of the respective radii of said rolls, and the same is true with respect to rolls 14, 22, when both are engaged with the work. To put it in another way, when all of the rolls are in engagement with the rod, the roll 14 overlaps each of the other two rolls 12, 22, circumferentially of the rod axis. Referring to Fig. 7, the roll 14 has a centrally located groove 14a about .088″ wide opposite the rib 12a of the roll 12. On each side of this is a rib 14b about .076″ wide, then a space or groove about .0675″ wide, then a narrow rib 14c about .0575″ wide, then another space of about .0685″ followed by six ribs 14d about .088″ wide separated by grooves .100″ wide.

In the case of each of the rolls, thrust collars are provided to accurately position the rolls and their shafts endwise. These collars are indicated at 11′ for shaft 11, 13′ for shaft 13, and 22′ for shafts 22c and 22d.

An opening 56 is provided in one of the posts 10b for the introduction of the stock to be cut which is in the form of a long rod 63. The location of this point is in endwise alinement with the trianguloid prismatic space shown in section in the diagram of Fig. 9, this space being defined by the peripheries of rolls 12, 14 and 22a, 22b at the point adjacent the cutting plane. When a cut is to be made the rod will be passed through the opening 56 until it engages a stop pin 57 which is firmly held in an arm 58 pivotally mounted at 59 in the stop block 60 which is secured to the frame 10. The blank at this time will lie in the position shown in Fig. 8 and the tool 52 will enter the blank opposite the rib 12a of the roll 12.

It will be noted with reference to Fig. 8 that to properly support a pin while it is being cut off the pin itself should be engaged by at least two ribs of a roll on one side and one rib of a roll on the other side. For instance when a pin is cut from the left end of the blank 63 in Fig. 8 by a tool entering opposite the rib 12a, the pin itself will be supported and rotated by two ribs 12b to the left of rib 12a and by corresponding registering ribs of the roll 22a which is not shown in Fig. 8. At the same time the rib 14c of the roller 14 will engage another side of the pin in a plane between the ribs 12b. It is probable also that the rib 14b will at least partially engage the pin near the end where it is cut off. This is one reason for supplying ribs located more closely together toward the center of the rolls because it permits proper support of a very short pin. In all cases each roll will usually include a sufficient number of disks to engage the rod over a length greater than that of the pin to be formed, although this is not essential.

When cutting pins of larger diameter it may be necessary to shift the position of rolls 22a and 22b as indicated in broken lines in Fig. 9 for the purpose of maintaining the proper trianguloid prismatic space about the blank 63 so as to engage the pin at three points about its periphery and enclose, confine and hold it between the three rolls while it is being cut. I find this is easily accomplished by using a spacer between the subframe 24 and the portion 10a of the main frame when cutting rods of smaller diameter as shown by the full line position of roll 22 in Fig. 9, and removing this spacer when cutting pins of larger diameter which corresponds to the broken line position of roll 22 in Fig. 9.

It should be understood that pins cut on my improved machine may have various end forms as indicated in Figs. 10 and 11. For instance the pin 61 might have a rounded end 61a and a beveled end 61b. The tool in this case would have a cutting nose 52a such as that indicated in Figs. 12 and 13. The pin 62 might have an end 62a beveled off and the other end square or have one of many other possible end forms. Obviously pins having both ends squared or beveled may be formed on my machine. An annular groove like that shown at 62b might be cut at the same time the end of the pin is formed and cut off, simply by providing a suitably shaped tool 52.

Figure 4:
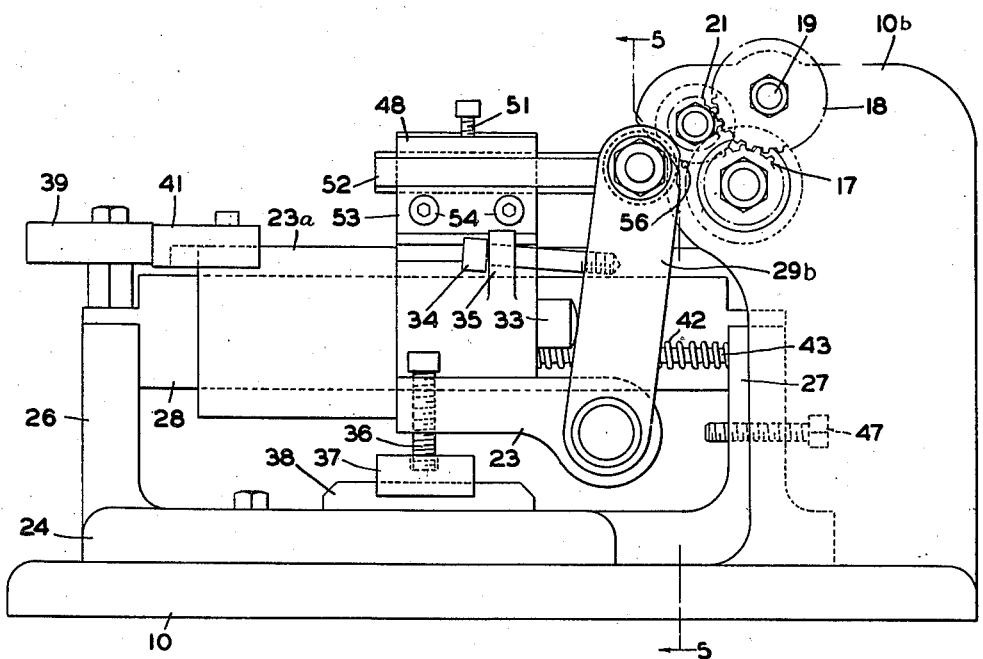
Fig. 4 is a side elevational view taken along the side opposite Fig. 1, and with the movable carriage in retracted position.

It is believed that the operation of this machine will be readily apparent. With the stock to be cut fed into the position of Fig. 8, either by hand or by machine, the carriage 23 is moved toward the left as viewed in Figs. 1 and 2 by operating the cam 39 either by hand or by machine. The pressure rolls 22a and 22b will first engage the blank while the mounting members 29a and 29b are in their extended position shown in Fig. 4.

Further movement of the carriage will cause the springs 31 to press the rolls 22a and 22b firmly against the stock at which time the trianguloid prismatic space is closed while permitting further movement of the carriage to cause the tool 52 to enter across the radius of the stock so as to form a complete cut. This cutting movement of the carriage will be limited by the stop pin 47. During this cutting operation the rolls 12 and 14 are positively driven by the gearing previously described and the rolls 22a and 22b will be frictionally driven through the medium of the blank being cut as will be readily understood from the diagram of Fig. 9. Thus both the main blank or rod and the pin cut therefrom will be rotated until the cut is complete, thus eliminating any burr or inequality in the end cuts. When the carriage 23 is moved backward after making a cut, thus opening the trianguloid prismatic space, the severed pin will drop down and the blank may be fed forward against stop pin 57 for the next cutting operation.

The machine as thus described operates satisfactorily. However, if necessary to insure the engagement of the blank 63 against the stop pin 57 during a cutting operation the rolls 22a and 22b may be shifted at a slight angle to the vertical by manipulating the screws 36 which engage the shoes 37 on opposite sides of the machine, turning one upwardly and one downwardly so as to slightly change the radial position of the carriage 23 relative to the shaft 28. This cannot be shown on the drawings because it would be very slight. The clearance between the interleaving disks or ribs of the various rolls may be made sufficient to permit this slight tilting of the rolls 22a and 22b. Obviously when these rolls are tilted in the right direction they will tend to urge the stock 63 toward the left as viewed in Fig. 8. A very slight tilting of one of the rolls serves to urge the stock against stop pin 57 while a cut is being made. With this construction I have been able to hold pins within one-half of one-thousandth of an inch of the desired length.

Some of the advantages of my machine will now be apparent. It is possible to turn a rod of very small diameter, say $\frac{1}{32}''$ or less, at a very high speed while holding the stock absolutely true and centered. If this were done in an ordinary chuck it would require very high speed driving apparatus. In the present case, however, with the driving rolls 12 and 14 of 1'' to 1½'' diameter and turning at between 300 and 400 R. P. M., a blank $\frac{1}{32}''$ in diameter will turn 12,000 R. P. M. or faster, thus giving cutting speeds up to 100' or 120' per minute, which is very desirable with some kinds of metal. The interleaving of the rolls 12, 14 and 22 and the close spacing of their respective axes permit the use of driving rolls of larger diameter while providing three-point support for the blank to be cut. This therefore makes possible the higher turning speeds of the blank with driving rolls rotating at relatively low speeds.

Where the ends of the pins have special forms, such as shown at 61a and 62a, absolute concentricity of this surface relative to the general cylindrical periphery of the rest of the pin is desirable. In my machine it is possible to obtain this because the three-point support of the blank being cut locates the center of the pin accurately with reference to the cylindrical surface of the blank and the cutting tool may be set in accordance with this center so as to obtain the end surfaces desired on the pins.

Attention is called to the fact that two end surfaces are formed at each cutting stroke of the tool 52. One end is on the pin cut off and the other end is on the next pin coming up. This saves one operation over the procedure customarily used which requires a separate operation on each end of each pin. The rod 63 is of sufficient weight to resist endwise movement by the cutting tool, or the rod advancing means holds it against such movement. Stop pin 57 holds the free end of rod 63 against endwise movement.

While the above described machine is one having the greatest utility, it is possible to realize certain features of my invention wherein a machine is constructed as shown in Figs 14 and 15, this showing being somewhat diagrammatic but readily understood from the description which has preceded it. In these views solid cylindrical rolls 12', 14', 22a' and 22b' occupy similar positions to the rolls 12, 14, 22a and 22b previously described except that their axes are not so closely spaced and their cylindrical surfaces meet substantially tangentially as shown in Fig. 14, thus supporting the rod to be cut at three spaced points about its circumference. These rolls may be mounted in the same type of machine first described and the cutting tool may enter the space between the rolls 22a' and 22b' to make the desired cut.

It will be understood that the term "cutting tool," as used herein, comprises any previously known tool which will effect the working operations described in the specification.

What I claim is:

1. In a pin cut off machine wherein a tool engages a cylindrical rod by motion in a plane transverse to the rod axis, a plurality of supporting cylindrical members rotatably mounted on axes generally parallel to the axis of said rod and having their peripheral surfaces engaging said rod on each side of said plane along three lines spaced about the rod circumference the axes of two of said members being spaced apart a distance less than the sum of their respective radii, and at least one of said supporting members being driven.

2. In a pin cutoff machine wherein a tool engages a cylindrical rod by motion in a plane transverse to the rod axis, a plurality of generally cylindrical rolls for supporting said rod and rotatably mounted on axes generally parallel to the axis of said rod, said rolls having their peripheral surfaces formed with alternate annular ribs and grooves, the ribs of one roll entering the grooves of another roll, and said rolls being so positioned that the peripheral surfaces of said ribs define a trianguloid prismatic space where they engage said rod.

3. In a pin cutoff machine wherein a tool engages a cylindrical rod by motion in a plane transverse to the rod axis, a plurality of generally cylindrical rolls for supporting said rod and rotatably mounted on axes generally parallel to the axis of said rod, said rolls having their peripheral surfaces formed with alternate annular ribs and grooves, the ribs of one roll entering the grooves of another roll, said rolls being so positioned that the peripheral surfaces of said ribs define a trianguloid prismatic space where they engage said rod, and said ribs being so narrow and closely spaced at least near the working point that two ribs of one roll and one rib of another roll will simultaneously engage a pin of the order of one-eighth of an inch long.

4. The combination of claim 2 including means carrying a tool for movement toward and away from said rod, and one of said rolls being yieldably mounted on said means in position to engage said rod in advance of said tool.

5. In a pin cutoff machine wherein a tool engages a cylindrical rod by motion in a plane transverse to the rod axis, three generally cylindrical rolls for supporting said rod and rotatably mounted on axes generally parallel to the axis of said rod, said rolls having their peripheral surfaces formed with alternate annular ribs and grooves, the ribs of two of said rolls being radially in registration, the ribs of the third roll entering the grooves of said two registering rolls, and said rolls being so positioned that the peripheral surfaces of said ribs define a trianguloid prismatic space where they engage said rod.

6. In a pin cutoff machine wherein a tool engages a cylindrical rod by motion in a plane transverse to the rod axis, two rolls rotatably mounted in said frame with their axes generally parallel, a carriage movable in a direction transverse to said axes, two rotatable coaxial rolls spaced apart endwise and having their common axis generally parallel to the axes of said first named rolls and mounted on said carriage for movement relative thereto and toward and from the rod axis, a tool also mounted on said carriage and extending through said space, means for driving one of said rolls, said rolls being so positioned that their peripheral surfaces define a trianguloid prismatic space and engage a rod at three points about its circumferential surface when said carriage moves said coaxial rolls toward the work, and means yieldingly urging said coaxial rolls forwardly upon said carriage to a position in advance of said tool, whereby, after said coaxial rolls engage said rod, said carriage must be moved farther toward the rod to cause the tool to engage it.

7. In a pin cutoff machine wherein a tool engages a cylindrical rod by motion in a plane transverse to the rod axis, two rolls rotatably mounted in said frame with their axes generally parallel, a carriage movable in a direction transverse to said axes, two coaxial rolls rotatably mounted on said carriage with their common axis generally parallel to the axes of said first named rolls, there being a space between said coaxial rolls, a tool mounted on said carriage and adapted to enter said space, means for driving one of said rolls, said rolls having their peripheral surfaces formed with alternate annular ribs and grooves, the ribs of one roll entering the grooves of another roll, said rolls being so positioned that their peripheral surfaces define a trianguloid prismatic space engaging a rod at three points about its circumferential surface when said carriage moves said coaxial rolls toward said two first named rolls, and said coaxial rolls being yieldably held by said carriage whereby, after said coaxial rolls engage said rod, said carriage may be moved farther toward the rod to cause the tool to enter it.

8. Means for rotating a cylindrical member of very small diameter comprising three rolls having their peripheral surfaces frictionally engaging said member at three points spaced about the periphery of said member, at least two of said rolls having their peripheral surfaces formed with alternate annular ribs and grooves, the ribs of one roll entering the grooves of another roll, means independent of said cylindrical member for rotating at least one of said rolls, and said one roll having a diameter of the order of twenty to one hundred times the diameter of said member.

9. In a machine for cutting pins from the end of a rod by means of a tool moving in a plane transverse to the axis of said rod, means for rotating said rod, and means for rotating said pin in axial alinement with said rod after said pin is severed from said rod whereby the severed end of said pin may be finished in said axially alined position.

10. The method of cutting pins from the free end of a rod blank, including the step of rotating the pin after severance in the same position it occupied before severance, whereby the severed end of the pin may be given the desired finishing cut.

11. In a machine tool, a tool or work holding carriage movable in a linear path, a support for said carriage pivoted on an axis extending parallel to said path, and two other spaced supports for said carriage one on either side of the axis of said first named support, one of said spaced supports being adjustable to move said carriage about said pivotal support whereby to provide three-point support for and adjustment of said carriage without side play.

12. In a pin forming machine, means for supporting and rotating a cylindrical pin comprising a plurality of generally cylindrical rolls for supporting said pin, said rolls being mounted on axes generally parallel to the axis of said pin, said rolls having their peripheral surfaces formed with alternate annular ribs and grooves, and the ribs of one of said rolls entering the grooves of another of said rolls.

13. Means for rotating a cylindrical member comprising three rolls having axes of rotation generally parallel to the axis of said member, said rolls having surfaces adapted to frictionally engage said member at three points spaced about the periphery of said member, said rolls having diameters of the same general order, at least two of said rolls having their peripheral surfaces formed with alternate annular ribs and grooves, the ribs of one roll entering the grooves of another roll, and means for rotating one of said rolls.

14. In a machine for cutting pins from the end of a rod by means of a tool moving in a plane transverse to the axis of said rod, means for rotating said rod, and means for rotating said pin in axial alinement with said rod at the same speed of rotation as the rod after said pin is severed from the rod, whereby the severed end of said pin may be finished in said axially alined position.

15. A machine for forming pins from a rod, comprising a plurality of rolls mounted on parallel axes spaced around the rod axis and confining the rod in a space between them, means for rotating one of said rolls, each roll consisting of a series of disk-like members each of a thickness of the order of the rod diameter and the disks of each roll being spaced apart along its axis by gaps of the same order, said disks having a diameter which is large when compared with the rod diameter, each of the several rolls including a sufficient number of disks to engage the rod over a length greater than that of the pin to be formed, and a tool movable generally radially of the rod.

16. In a pin cutoff machine wherein a tool engages a cylindrical rod by motion in a plane transverse to the rod axis, a plurality of cylindrical members rotatably mounted upon three axes generally parallel to the axis of said rod and having peripheral surfaces engaging said rod on each side of said plane along three lines spaced about the rod circumference, at least one of said members being driven, and the several members being of such diameter and so disposed that when all thereof engage the rod the said three axes are so distributed around the rod axis that one roll on one axis overlaps rolls on the other two axes circumferentially of the rod axis.

17. A pin cutoff machine wherein a tool engages a cylindrical rod by motion toward the rod axis, comprising a frame, means thereon for supporting a rod with its axis extending horizontally, a plurality of rod engaging members mounted in said frame for rotation upon three axes parallel to and distributed angularly about the rod axis with one of said three axes lying above and two lying below a horizontal plane through the rod axis, the members upon one of said three axes which is below said plane being movable toward and from the rod axis and the remaining members being immovable relative thereto, and means whereby one of said members may be driven to rotate the rod.

LANE W. DUNCAN.